United States Patent [19]

Li

[11] Patent Number: 5,058,001

[45] Date of Patent: Oct. 15, 1991

[54] TWO-DIMENSIONAL ARRAY OF PROCESSING ELEMENTS FOR EMULATING A MULTI-DIMENSIONAL NETWORK

[75] Inventor: Hungwen Li, Pleasantville, N.Y.

[73] Assignee: International Business Machines Corporation, Armonk, N.Y.

[21] Appl. No.: 407,678

[22] Filed: Sep. 14, 1989

Related U.S. Application Data

[63] Continuation of Ser. No. 22,194, Mar. 5, 1987, abandoned.

[51] Int. Cl.⁵ ............................................. G06E 15/80
[52] U.S. Cl. .................................... 364/200; 364/229;
364/231.9; 364/260.1; 364/260.4; 364/262;
364/736
[58] Field of Search ................. 364/736, 200 MS File,
364/900 MS File; 382/41

[56] References Cited

U.S. PATENT DOCUMENTS

| | | | |
|---|---|---|---|
| 4,174,514 | 11/1979 | Sternberg | 340/146.3 |
| 4,215,401 | 7/1980 | Holsztynski et al. | 364/200 |
| 4,247,892 | 1/1981 | Lawrence | 364/200 |
| 4,309,691 | 1/1982 | Castleman | 364/200 |
| 4,314,349 | 2/1982 | Batcher | 364/716 |
| 4,380,046 | 4/1983 | Fung | 364/200 |
| 4,398,176 | 8/1983 | Dargel et al. | 382/27 |
| 4,514,807 | 4/1985 | Nogi | 364/200 |
| 4,523,273 | 6/1985 | Adams, III et al. | 364/200 |
| 4,601,055 | 7/1986 | Kent | 382/49 |
| 4,633,431 | 12/1986 | Bar | 364/900 |
| 4,639,857 | 1/1987 | McCanny et al. | 364/200 |
| 4,709,327 | 11/1987 | Hillis et al. | 364/200 |
| 4,718,005 | 1/1988 | Feigenbaum et al. | 364/200 |
| 4,739,474 | 4/1988 | Holsztynski | 364/200 |
| 4,739,476 | 4/1988 | Fiduccia | 364/200 |
| 4,910,665 | 3/1990 | Mattheyses et al. | 364/200 |

OTHER PUBLICATIONS

"Geometric Arithmetic Parallel Processor", NCR, 1984, pp. 1–12.
"The Connection Machine", W. Daniel Hillis, The MIT Press, pp. 21, 71–80.
"Clip 4 Parallel Processing System", Fountain et al, IEEE Proc., vol. 127, Pt. E, No. 5, Sep. 1980, pp. 219–224.
"Design of a Massively Parallel Processor", Kenneth Batcher, IEEE Transaction of Computer, vol. C-29, No. 9, Sep. 1980, pp. 836–840.
M. V. A. Hancu et al, "A Systolic Scheme for Fast Parallel Communication in VLSI Mesh-Connected Parallel Computers".

*Primary Examiner*—Thomas C. Lee
*Attorney, Agent, or Firm*—Philip J. Feig

[57] ABSTRACT

Two-dimensional mesh architecture in an array processor of myriad processing elements allows relative ease in manufacturing, using planar integrated circuits and predominant X, Y connections. There is a need, in any array processor, to connect a selected processing element to another processing element. Rather than to supply the large number of connectors required for dedicated connection of processing element to processing element, implementation is by a very limited number of connecting conductors (NESW) in a two-dimensional mesh. The connecting conductors are coplanar, making construction compatible with present-day, essentially planar and predominantly XY, packaging of integrated circuits and printed circuit boards. Flexibility of interconnection by means of this limited and inflexible set of conductors is accomplished by equipping each processing element with a hopping circuit. This is an advantageous tradeoff of silicon area, since the few active elements of the hopping circuit consume much less silicon area than the large number of conductors otherwise required. The hopping circuits are programmable, by a shared routing controller, to send input to an internal register file within the processing element, or to respond to a HOP (direction)(step) command. The HOP command selects the direction parameter by selecting one of the limited external connections to an adjacent processing element. Connection to a remote processing element requires a number of HOP command steps, carried out in a series of cycles. Each hopping circuit includes multiplexer, sink register, demultiplexer and gates.

6 Claims, 1 Drawing Sheet

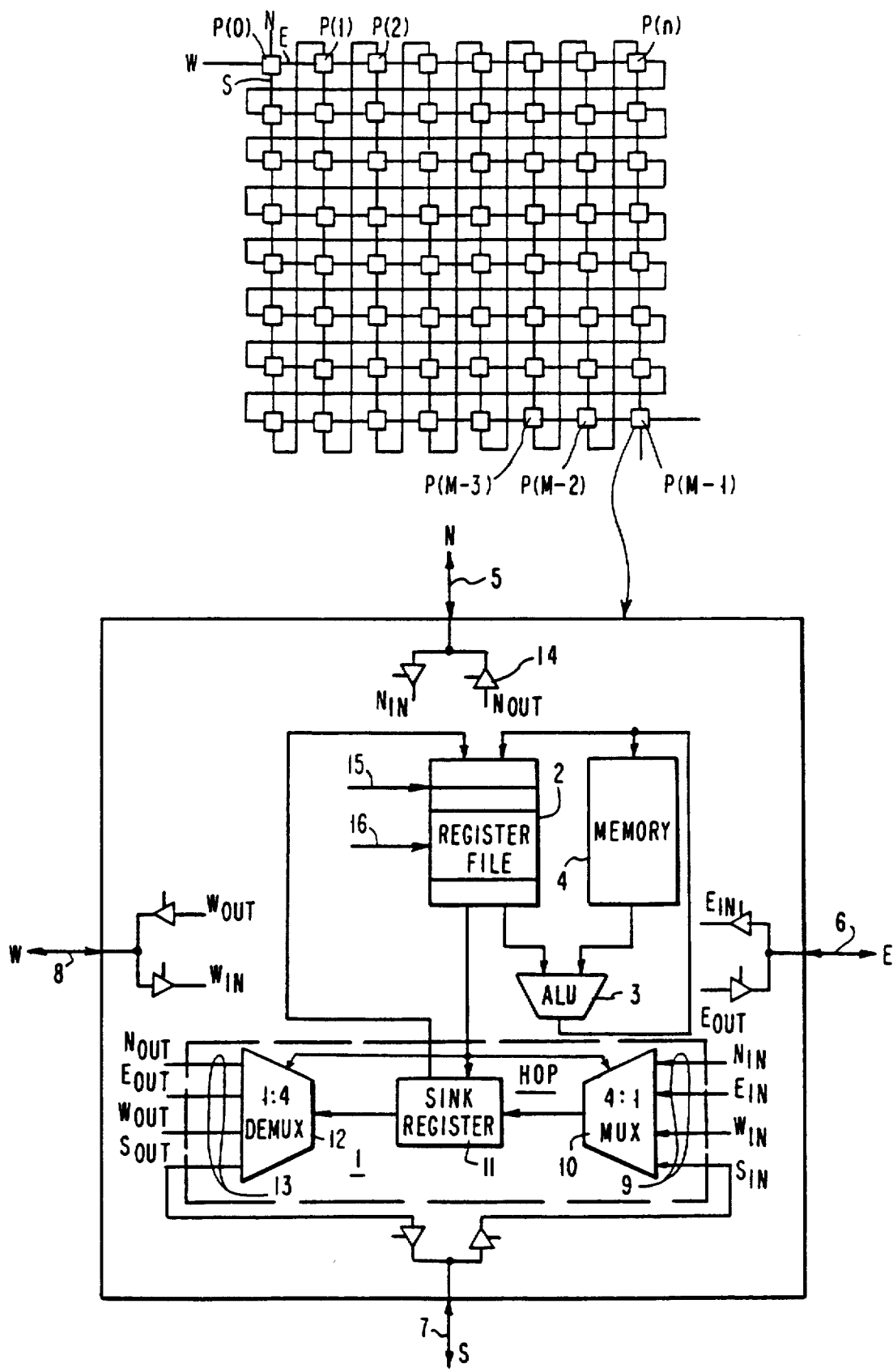

TWO-DIMENSIONAL ARRAY OF PROCESSING ELEMENTS FOR EMULATING A MULTI-DIMENSIONAL NETWORK

This application is a continuation of application Ser. No. 07/022,194 filed Mar. 5, 1987, now abandoned.

BACKGROUND OF THE INVENTION

1. Field of the Invention

This invention relates to architecture for complex array processors made up of great numbers of interconnected relatively simple processing elements, and more particularly relates to an architecture for an array processor in which architecture significant multidirectional connectivity is implemented by providing each processing element with X,Y mesh connections but very limited diagonal or Z connections, and having controls which arrange the connectivity hardware so that data may "hop" from sending processing element to selected receiving processing element, which may be adjacent or remote, using the X,Y mesh connections in elemental hops without crossovers or vias.

2. Description of the Prior Art

The following patents and general publications are representative of the prior art:

PATENTS

U.S. patent application Ser. No. 06/902,343, Li, POLYMORPHIC MESH NETWORK, filed Aug. 29, 1986, now abandoned shows an array processor in which each processing element is equipped with a program-accessible connection control mechanism so as to provide a programmable choice of network configuration. This permits the user to set up an optimum network of connections, using the connection control mechanisms of intervening processing elements to provide within a single cycle a data connection between an originating processing element and a receiving processing element.

PUBLICATIONS

D. Hillis, *The Connection Machine*, MIT Press, Cambridge, Mass., 1985, describes a machine having a multidimentional array architecture consisting of 64,000 processors connected by a hypercube network.

T. F. Fountain and V. Goetcherian, "Clip 4 parallel processing system," IEE proc, vol. 127, Pt. E. No. 5, September 1980, describes a machine having a two-dimensional array architecture consisting of 96×96 processors interconnected by a mesh network.

K. E. Batcher, "Design of a Massively Parallel Processor," IEEE Trans. on Computers, September 1980, pp. 836–840, describes a machine having a two-dimensional array architecture consisting of 128×128 processors connected by a mesh network.

NCR Corp., "Geometric Arithmetic Parallel Processor," Data sheet, 1984, describes a VLSI chip containing 72 processors conneted as a two-dimensional array organized as 6×12.

Today's exploratory multiprocessors are regarded as promising candidate supercomputers of the near future. In this perspective, much research effort has been devoted to technological issues essential to the building of the multiprocessors. Among the issues, the interconnection network takes a primary role.

The study of interconnection networks has its root back to the switching network for telephone communication. Excellent survey papers periodically summarize the state of development, but tend to emphasize theoretical performance of the network while neglecting the problem of packaging. The studies also neglect the problem of network performance for a specific algorithm.

In this regard, one may ask whether a network with better theoretical complexity retains any advantage when implemented in disadvantaged packaging. The advantage may be dissipated by the cost, or by the performance loss due to packaging which is not optimal. The question always remains whether it is better to back off from the theoretically advantageous complexity in order to make a practical machine.

Various techniques, including hardwire implementation of very complex networks, and including bus connection channels with channel connection computation, tend to overwhelm the capability of the packaging. Packaging is a crucial factor in constructing a supercomputer. It not only affects the performance but also the manufacturability of the supercomputer. A good interconnection network for a supercomputer shall possess good properties of packaging as well as capability to implement the requisite interconnection complexity (graph embedding) for the architecture chosen. When implemented in very large scale integration (VLSI) chips, the architecture must provide both the processing capability and the interconnection capability, which may be considered as "overhead," since it merely services the processing elements which do the active processing. The interconnection overhead, however, becomes enormous as the architectural demand for universal connectability increases, and as the number of processing elements increases. Two processing elements, for example, can communicate directly on one duplex channel. But each of four processing elements (2×2 array) requires, to communicate directly with the other three, three duplex channels, a total of six duplex channels for the array. In progression, each of nine processing elements (3×3 array) requires, to communicate directly with the other eight, eight duplex channels, a total of thirty-six duplex channels for the array. This exponential proliferation of interconnection overhead (usually stated in terms of silicon area) has been an unsolved problem. The perception that computational capability increases with complexity of connection may be theoretically correct, but only without including the packaging consideration. Considering the packaging of the interconnection network, this invention is a counter example to such perception.

The hypercube networks in the prior art use a multidimensional array architecture that is a compromise of a direct connection among all processors. It allows each processor to have logN direct neighbors where N is the total number of processors. With elegant organization of these connections, the hypercube is versatile and has been implemented in a machine called Connection Machine. A three-dimensional hypercube (a cube) can be formed from a two-dimensional hypercube (a square) by connecting the corresponding vertices of two nearby squares. To form a 4-degree hypercube, connect the corresponding vertices of two nearby cubes. Such a process can be summarized as a mathematical expression in numbering a vertex and its neighbors.

SUMMARY OF THE INVENTION

The inventive architecture provides each equipped processing element with a HOP capability, which enables each processing element to send its data content to the adjacent (NESW) processing element specified by the HOP (direction)(step) command direction parameter. The HOP capability also enables each equipped processing element to send its data content via the adjacent processing element, and subsequently via its respectively adjacent processing element, in a number of steps specified by the step parameter to a selected remote processing element. There is no need for a dedicated conductor between the sending processing element and the receiving processing element at its remote location.

For a three-dimensional hypercube, the address of a node (or vertex) can be represented by three bits $B_2B_1B_0$ and a vertex has three neighbors (one in each dimension). The address of the neighbor in the first dimension is to invert $B_0$ while the address of the neighbor in the second dimension is to invert $B_1$ and $B_2$ for the neighbor in the third dimension. For example, node 5 (i.e. 101) has 100 as neighbor in the first dimension, 111 in the second and 001 in the third dimension.

Generalizing this addressing and connecting scheme, for a k-dimensional hypercube, the i-th dimensional neighbor of a node $B_{k-1} \ldots B_{i+1}B_iB_{i-1} \ldots B_0$ is $B_{k-1} \ldots B_{i+1}BI_iB_{i-1} \ldots B_0$ where BI is the inverse of B. (e.g. if B=1, then BI=0 or vice versa). Such a scheme guarantees that the communication between any pair of processors in a k-dimensional hypercube connection can be accomplished in k steps of message sending. A message travels towards its destination by examining the $B_i$ bit of the destination address. When $B_i$ is "1," the message is routed to the neighbor in that dimension. Since there are no more than k "1"s in the address, the message will reach its destination in k steps.

Besides the k-step guarantee, the hypercube connection is very general and versatile because many important connections for computing can be embedded in the hypercube; these include tree, pyramid and string. Unfortunately, the hypercube connection requires a large number of wires (a k-dimensional hypercube needs $(k/2) \times 2^k$ wires for connection) which causes engineering problems such as skewing and packaging in implementation. An even worse problem for the hypercube is that those wires are distributed in a k-dimensional space but can only be realized in two- or three-dimensional space mainly because of today's packaging technology in both integrated circuit and printed circuit board. The mismatch between the logical graph in high dimension and the available packaging technologies in two- or three-dimension further enhances the difficulty in implementation.

This invention accomplishes the hypercube connection on a two-dimensional mesh. For a computer with $2^k(=M=n \times n)$ processors in hypercube, the invention reduces the required wires from $(k/2)*n*n$ in k-dimensional space to 4n wires in two-dimensional space. The reduction in both the total number of wires and the dimensionality of the space spanned by these wires leads to a parallel architecture that is highly suitable for today's packaging technology mainly restricted in two-dimensional integrated chip and printed circuit board.

The invention comprises two elements: a hopping circuit in each processing element of the mesh, and a controller to command the hopping circuit. In a two-dimensional mesh, each processor connects to its four neighbors in North, South, East and West directions. At the boundary of a mesh, the connection is as follows: for each row, the "E" edge of the rightmost column of the mesh can be connected to the "W" side of the leftmost column either in the same row or next row. The choice is usually programmable, but not for the purpose of this invention, it is connected to the "W" side of the next row. In the same way, for each column the "S" side of the bottom row is connected to the "N" side of the next column. The invention is effective with the two-dimensional mesh array preferred for quantity manufacture. Even though the hopping circuit is replicated in each of the myriad processing elements in the mesh, this replication is significantly less resource-consuming than the myriad interconnections which it makes unnecessary. Processor-to-processor communication takes place through the hopping circuits as commanded by the controller, using only the simple X, Y connections of the mesh. Conflicting demand for the same connection does not occur because of the control algorithm. Processing element connectivity is not limited by near neighbors; remote processing elements may be interconnected easily.

An object of the invention is to provide hypercube "connections" of processing elements, using simpler and fewer interconnections than previously required, using the HOP command to control a hopping circuit in each of the affected processing elements.

A more specific object of the invention is to provide for hypercube connections in a two-dimensional mesh array processor having only N, E, W, S connections actually present, activating the necessary external connections by implementing a HOP command or a series of HOP commands.

A feature of the invention is a hopping circuit, implemented in each of the myriad processing elements of the array, which together with a controller carries out without conflicts a wide variety of processing element interconnections on very simple mesh connections such as NESW.

Another feature of the invention is the HOP (direction)(step) command, for interconnecting processing elements in an array of processing elements each equipped with a hopping circuit, with a hop in the direction specified by the direction parameter, and a number of additional hops, in respectively specified directions, specified by the step parameter.

An advantage of the invention is that a very simple hopping circuit, implemented in each of the myriad processing elements of the array processor, eliminates the need for very complex patterns of interconnection.

Another advantage of the invention is that it is easily implemented in two-dimensional integrated circuit technologies currently popular.

Other objects, features and advantages of the invention will be apparent from the following description of the preferred embodiment, as illustrated in the accompanying drawing.

BRIEF DESCRIPTION OF THE FIGURE

FIG. 1 is a composite drawing showing a representative portion of an array processor implemented as a 2-D mesh array, with one of the myriad processing elements shown in block diagram format with additional details in the hopping circuit.

DESCRIPTION OF A PREFERRED EMBODIMENT

FIG. 1 shows a two-dimensional mesh of M processing elements PE0 ... PE(M−1). Processing element PE(M−1) is shown expanded into a block diagram showing hopping circuit 1, register file 2, arithmetic and logic unit (ALU) 3 and memory 4, as well as NESW interconnections 5-8. Register file 2, ALU 3 and memory 4 are standard features of processing elements in array processors, which may be considered as single-bit (or single byte) computers. The processing operation in such array processors is characterized by sequential transfer of data (such as a raster image) through a sequence of processing elements. Each processing element performs a simple assigned task on the data input and passes the result to an output for transfer to the input of the next processing element, with no need to query memory for the next set of operands and related instruction. An input image flows, with changes made each clock cycle, from start to finish through the simple processing elements in the array, using interconnections to pass data from originating processing element to receiving processing element. The configuration of these interconnections in this invention is simple north, east, south, west (NESW).

Note that these interconnections connect from processing element to each of four adjacent processing elements; these external connections 5-8 also connect internally as connection bundle 9 and 13 directly to hopping circuit 1. The NESW bundle (9) of internal connections passes through 4:1 multiplexer 10 to sink register 11, and thence via 4:1 demultiplexer 12 to output terminal bundle 13 and to external connections 5-8. The content of register 2, which preferably is a set of several separately gated registers, can be loaded to or from sink register 11.

For the HOP operation, in a given clock cycle, the content of sink register 11 goes out to a selected external connection 5-8 via demultiplexer 12 and connection 13; during the same clock cycle, the content of the sink register 11 is replaced by input from external connection 5-8 via multiplexer 10.

EDGE OF ARRAY CONNECTIONS

For each row, the "E" edge of the rightmost column of the mesh can be connected to the "W" side of the leftmost column either in the same row or next row. The choice is usually programmable, but for the purpose of this invention, it is connected to the "W" side of the next row. In the same way, for each column the "S" side of the bottom row is connected to the "N" side of the next column.

Each processing element in the mesh is a one-bit processor. It has an Arithmetic Logic Unit (ALU) 3, a register file 2, and a local memory 4. Each processing element is equipped with 4 ports (N, S, W and E) to communicate with its immediate neighbors in the mesh. The processing element also has an instruction set to perform the ALU operations, to move the data to/from registers and 4 ports, to move the data to/from register and local memory. A "mask register" (REGISTER$_{MASK}$) (not shown) is used to control the writing and reading to memory and registers via lines 15 and 16. When REGISTER$_{MASK}$=1, writing to memory and registers is in effect while when REGISTER$_{MASK}$=0, writing to memory and registers is not activated and the memory and registers maintain their values prior to the execution of the instruction commanding the writing.

HOPPING CIRCUIT

The hopping circuit shown in FIG. 1 accepts the N, S, W and E as input signals and produces Nout, Sout, Wout and Eout as four output signals. The hopping circuit consists of one sink register 11, one 4-to-1 multiplexer 10 and one 1-to-4 demultiplexer 12. Their functions are as follows:

The multiplexer 10 selects one out of four input signals (N, S, W and E) as the output signal and feeds the output signal to the sink register 11.

The demultiplexer 12 distributes the content of the sink register 11 to one of the four wires: Nout, Sout, Wout and Eout. which are connected to N, S, W and E respectively via tristate diodes 14.

The sink register 11 is a closed-coupler consisting of two inverters controlled by two transistor gates. These gates, one in front of the coupler and one after, are to control the datum flowing from the multiplexer 10 into the first inverter and the datum flowing out of the second inverter to the demultiplexer 12.

HOPPING INSTRUCTION

The hopping instruction is the foundational mechanism to embed the hypercube in a mesh-connected machine. The instruction directly drives the data in and out of sink register 11 such that the routing function of the hypercube can be implemented by HOP instruction.

The HOP instruction is of the format

HOP (direction)(step).

The keyword "HOP" is the command to drive the hopping circuit. It has two parameters: the first one "direction" can be N, S, W and E; and the second one "step" is an integer. "HOP N" commands the multiplexer 10 to select S to be stored in the sink register 11. It also commands the demultiplexer 12 to select N$_{OUT}$ as the destination of the current content of the sink register 11. "HOP S" will do the opposite: commanding the multiplexer 10 to select N and the demultiplexer 12 to select S$_{OUT}$. By the same token, "HOP W" commands the multiplexer 10 to select E and the demultiplexer 12 to select W$_{OUT}$ while "HOP E" does the opposite: commanding the multiplexer 10 to select W and the demultiplexer 12 to select E$_{OUT}$.

The second parameter, the step, commands the HOP activity to repeat the number of times equal to "step." The repetition is done by generating a number of clock (equal to "step") edges feeding the control gates of the closed-coupler such that the hopping occurs no more and no less than "step" times.

There may be occasions where the user prefers to carry out a simple data retention operation, with a possible move of data from one position in register file 2 to another, with a possible masking. Even without any data manipulation, it may be desired to carry out a No-Operation command, which in this context is the NOHOP command. The NOHOP command does not activate any external connection 5-8, but simply cycles data through sink register 11 back to register file 2, with any desired data manipulation carried out by standard techniques.

HOPPING CONTROL COMMAND

Using the aforementioned hopping circuit and HOP instruction, the hypercube can be embedded in a mesh-connected computer. Assuming the mesh-connected computer is of size $k \times k$ where $k=2^m$, the routing function of the hypercube can be implemented as follows.

(A) Hopping step smaller than k ($0 \leq I < m$ case)

With the $k \times k$ mesh arrangement, a processor at (s, t) entry of the mesh is numbered as PE(t+k*s) or equivaently, the address of of PE(s, t) in mesh is PE(t+k*s) in hypercube where $0 \leq s$, $t < k$. Therefore, the routing function of the hypercube $CM_I(P)$ where P is the PE address in a 2m-bit string requires the flipping of I-th PE address bit. For PE with I-th address bit equal to "0," flipping means adding $2^I$ to P; while for I-th bit equal to "1," flipping means subtracting $2^I$ from P.

The adding and subtracting are equivalent to HOP E and HOP W; consequently $CM_I(P)$ can be implemented as HOP E, $2_I$, if $B_I = 0$
or HOP W, $2_I$, if $B_I = 1$ in the mesh connected computer.

The hopping control command therefore can be described as

SINK REGISTER←TARGET REGISTER;
REGISTER$_{mask}$←$B_I$;
HOP W, $2^I$;
INVERT REGISTER$_{mask}$;
HOP E, $2^I$;
TARGET REGISTER←SINK REGISTER;

(B) Hopping step greater than k ($m \leq I < 2m$ case)

In this case, the hopping step is greater than k (the side size of the mesh). Because of the mesh arrangement and the hopping step is always a multiple of k, the hopping occurs along the column direction of the mesh.

Similar to case (A), the routing function of the hypercube $CM_I(P)$ involves adding or substracting $2^I$ to or from P depending on the I-th address bit is "0" or "1" respectively. The adding can be done by HOP S while the subtracting can be done by HOP N.

The hopping control command for case (B) then is described as follows.

SINK REGISTER←TARGET REGISTER;
REGISTER$_{mask}$←$B_I$;
HOP N, (I−m+2);
INVERT REGISTER$_{mask}$;
HOP S, I−m+2;
TARGET REGISTER←SINK REGISTER;

BENEFITS (1) Reduction of total number of wires for connection

A parallel processor consisting of M processors in hypercube connection requires $(M/2)*\log M$ wires among the processors. With $M = 2^{12}$, the total number of wires requires is 24K (K=1024). When implemented in mesh as in this invention, the total number of wires required is 4n (where $N = n \times n$); with $N = 2^{12}$, the mesh implementation needs only 256 wires.

The significant reduction in the total number of wires leads to tremendous packaging advantages (usually much compact in size). The compact size means shorter wire between any pair of processors which in term reduces signal travelling time and raises system clock rate.

(2) Reduction of the dimensionality spanned by the wires

Packaging a large (e.g. $2^{16}$) parallel processing system is recognized as the most critical issue in the parallel processing technology because when the size of the system grows, the wires connecting the processors become lengthier leading to a serious skewing problem and a slower system clock rate.

Today's electronic packaging technologies (e.g. VLSI, printed circuit board and surface mount) are two-dimension-oriented consequently are in favor of a two-dimensional connection. Comparing the multidimensional hypercube connection and its two-dimensional implementation described in this patent, the latter has significant benefit in accomplishing simpler system packaging therefore faster system clock rate.

While the invention has been shown and described as a two-dimensional mesh architecture with limited processing element interconnections made effective by the HOP command, it is obvious to those skilled in the art that the foregoing and other variations in form and detail may be made without departing from the spirit and scope of the invention, as pointed out in the following claims.

What is claimed is:

1. A two-dimensional mesh array of processing elements for emulating a multi-dimensional network, each said processing element being interconnected with immediately adjacent processing elements for transmitting data between adjacent and remote processing elements, each said processing element comprising:
   a plurality of connection means for coupling said processing element to immediately adjacent processing elements in the mesh array;
   register file means for providing local HOP command instructions each having a direction parameter and a step parameter for implementing HOP (direction) (step) operation by selecting one of said plurality of connection means of the processing element in accordance with said direction parameter to thereby transmit data content from one of said immediately adjacent processing elements to another one of said immediately adjacent processing elements in the specified direction and repeating the transmission a quantity of times specified by said step parameter, and
   a hopping circuit coupled to said register file means for transmitting data from a selected one of said plurality of connection means to another selected one of said plurality of connection means responsive to said local HOP command instruction for emulating a multi-dimensional network.

2. A two-dimensional mesh array of processing elements as set forth in claim 1, wherein said hopping circuit includes a multiplexer coupled to said plurality of connection means, a demultiplexer coupled to said plurality of connections means and a sink register coupled to said multiplexer means, said demultiplexer means and to said register file means.

3. A two-dimensional mesh array of processing elements as set forth in claim 1, wherein said register file means provides said local HOP command instruction for implementing NOHOP operating by selecting internal routing in the processing element to transmit data content output of said register file to a selected parameter in said register file.

4. A two-dimensional mesh array of processing elements as set forth in claim 2, wherein each said processing element further comprises memory means and Automatic Logic Unit means.

5. A method of emulating a multi-dimensional network using a two-dimensional mesh array of processing elements comprising the steps of:
   coupling each said processing element in the mesh array to immediately adjacent processing elements in the mesh array, and executing local HOP command instructions each having a direction parameter and a step parameter for implementing HOP (direction) (step) operation to thereby transmit data content from one immediately adjacent processing element to another immediately adjacent processing element in accordance with said direction parameter and repeating the transmission a plurality of times specified by said step parameter for emulating a multi-dimensional network.

6. A method of emulating a multi-dimensional network as set forth in claim 5, wherein said providing local HOP command instructions implements NOHOP by selecting routing within the processing element.

* * * * *